May 18, 1948.   W. BOLSTER   2,441,556
STABILIZED GYRO-COMPASS
Filed May 10, 1939   2 Sheets-Sheet 2

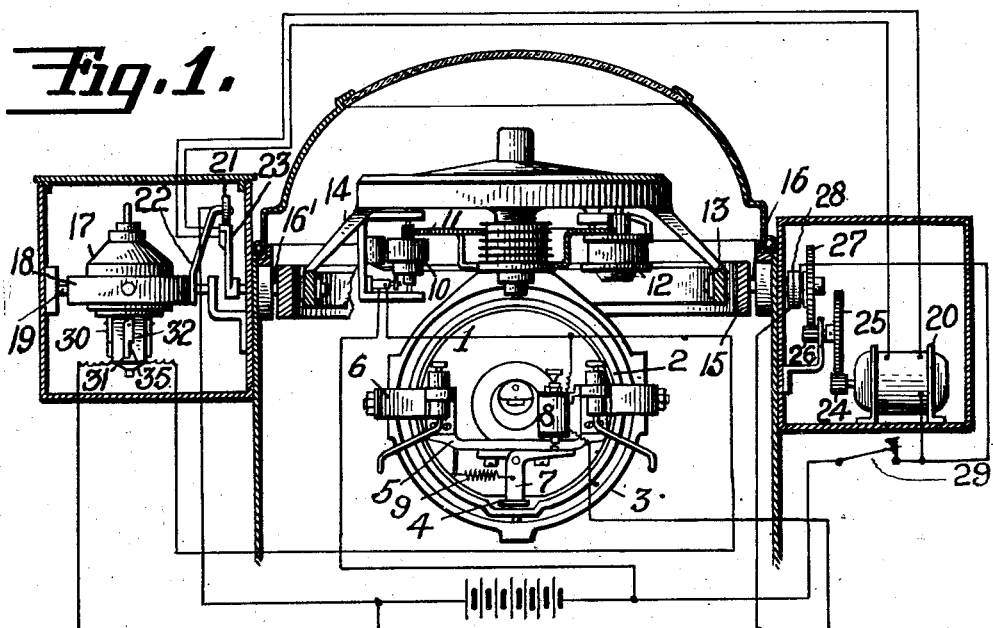

INVENTOR
WILLIAM BOLSTER
BY
Herbert H. Thompson
HIS ATTORNEY.

Patented May 18, 1948

2,441,556

UNITED STATES PATENT OFFICE 2,441,556

STABILIZED GYROCOMPASS

William Bolster, Baldwin, N. Y., assignor to The Sperry Corporation, a corporation of Delaware Application May 10, 1939, Serial No. 272,797

6 Claims. (Cl. 33—226)

This invention relates to improvements in gyroscopic direction indicators or compasses and, more especially, to the prevention of the errors in the readings thereof due to combined rolling and pitching of the ship. There are at least two so-called errors in a compass due to this cause, which are not due to actual displacement of the compass element from the meridian, but to the peculiar movements of both the ship and the compass in its gimbals under combined rolling and pitching. The former is usually referred to as the "weather yaw" of the ship and is an actual temporary turning or twisting of the ship in azimuth under these conditions. This of course appears in the compass readings and is not, therefore, a false reading in any sense since the ship actually turns in azimuth slightly back and forth under these conditions. The second error is termed "false yaw" and is due to the gimbal mounting of the compass on the ship, which gives rise to a plus and minus false reading as the ship rolls and pitches.

I am aware that it has been proposed to eliminate the last mentioned error by using a second gyroscope comparable in size to the compass gyro and stabilizing the compass gyroscope in a plane at right angles to its plane of stabilization. This attempted solution of the problem, however, has never come into use on account of the added weight and difficulty of maintaining the compass at all times vertical. By such a construction the device was given a long period about both horizontal axes and, in slowly oscillating, its vertical axis would deviate considerably from the true vertical.

As a result of analysis and experimentation, I have devised a much simpler method of eliminating the false yaw error by employing a small auxiliary gyro-vertical and stabilizing therefrom one gimbal axis only of the compass, preferably the major axis of the gimbal ring, although the compass may be stabilized about both axes. According to my invention, the stabilized axis is also preferably parallel to the roll axis of the ship, about which, of course, the more violent oscillations of the ship occur. In view of the importance of maintaining the compass axis exactly vertical, I prefer to provide the gyro-vertical with a means for eliminating the erecting force on the same during turns or change of speed of the ship. Such means may be conveniently operated from the same turn detecting means as operates the damping eliminator on the compass. While I have shown my invention as applied to a standard ship's gyroscopic compass, it is obvious that the same principles may be equally well applied to the broad field of gyroscopic direction indicators of which the ship's gyroscopic compass is a prominent example but which field also includes the directional gyroscope and the gyro-magnetic compass. It is to be understood therefore, that in the specification and claims I used the term "gyroscopic compass" in its broader sense as a gyroscopic direction indicator, and the term "ship" in the broad sense of any dirigible vehicles including airborne as well as waterborne craft.

Referring to the drawings, showing two forms my invention may assume,

Fig. 1 is a south elevation of a gyro compass provided with my improved stabilizing means.

Fig. 2 is an enlarged vertical section of the lower portion of the gyro-vertical showing the means for eliminating the erection during a turn.

Fig. 3 is a horizontal section of the same, taken on line 3—3 of Fig. 2.

Fig. 4 is an enlarged view of the turn or change of speed detecting means on the compass.

Figure 6:
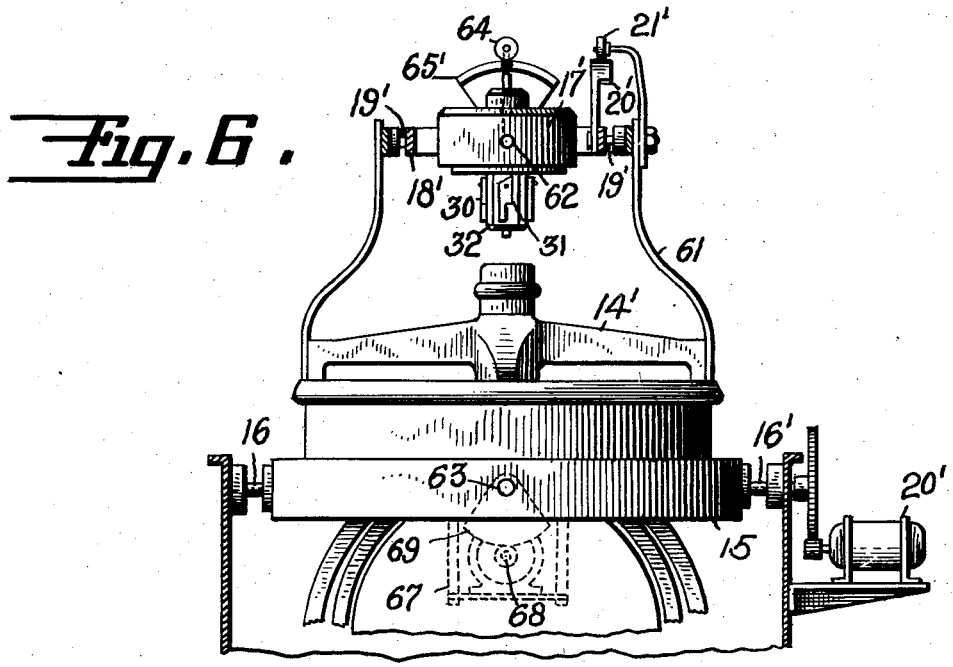
Fig. 6 is a side elevation of the same.

For illustrating my invention, I have shown a standard gyro compass of the Sperry type, the rotor casing being shown at 1, said casing being mounted as usual for oscillation about a horizontal E-W axis in the vertical ring 2 which, in turn, is mounted for freedom about a vertical axis in a phantom or follow-up ring 3. The meridian seeking and damping properties are both imparted to the compass by means of a normally eccentric connection 4 between the framework 5, carrying the mercury ballistic 6, and the bottom of the gyro casing, said connection being provided by pivoted arm 7. For eliminating the damping during turns, I have provided an electro-magnet 8 which, when excited, rotates the arm 7 against a spring 9 to eliminate the eccentricity of the connection, thereby eliminating the damping. Normally, said magnet is controlled from a turn or motion detecting device 10 geared to the main azimuth gear 11 of the gyro compass, which is driven from the azimuth motor 12. Although any suitable form of motion detecting device may be employed, I have shown the form disclosed and claimed in the patent to B. A. Wittkuhns and Pierre Chantemerle, No. 2,406,879, dated September 3, 1946.

Essentially this device comprises a permanent magnet 50 and a spaced encircling shell 51 of soft iron, both secured to the shaft 52 which is geared through pinion 53 to the azimuth or follow-up gear 11 on the compass. Between this magnet and shell I locate a sheet metal annulus 55 of copper or other conducting but non-magnetic material. Said annulus is mounted for independent rotation on bearings 56, is normally centralized by a spring 57 and is preferably damped by some form of dashpot 58. It will be readily apparent that continued rotation of shaft 52 in one direction or the other will cause displacement of the copper annulus against the tension of the spring 57, thereby closing one or the other of spring contacts 59 to excite magnet 8. Such a motion detecting device may also be used for exciting the magnet on change of speed of the ship, if desired, as disclosed in the aforesaid patent of Wittkuhns and Chantemerle.

The compass is supported in the usual binnacle ring 13 by brackets 14, said ring being pivoted about the pitch axis of the ship in the gimbal ring 15 which, in turn, is pivoted about the roll axis of the ship on trunnions 16 and 16'. The compass as a whole is usually made decidedly pendulous (as shown) about both the aforesaid gimbal axes 15 and 16. It is about roll axis 16 that I prefer to stabilize the compass. For detecting the tilting of the gimbal from the horizontal, I provide an auxiliary gyro-vertical 17 which may be much smaller than the gyro compass, since it is only used to maintain a horizontal reference plane. Said gyro-vertical is shown as mounted in a gimbal ring 18 with its major axis 19 parallel to and preferably in line with the major axis 16—16' of the gyro compass. There is provided a pick-off between the gimbals 15 and 18 responsive to any relative tilt thereof for actuating a servo motor 20 for stabilizing the compass gimbal. Said pick-off may be of any suitable type, contact, inductive or otherwise, but I have illustrated the same as a simple trolley 21 mounted on an arm 22 secured to the gimbal 18 of the gyro-vertical, and which cooperates with a reversing contact segment 23 secured to an extension of the trunnion 16' of the gimbal 15.

The motor 20 is shown as connected through reduction gearing 24, 25, 26, 27 to trunnion 16. Preferably, however, a clutch 28 is interposed between the gear 27 and the trunnion 16 so that the motor may be disconnected and the gimbal freed when not in use, dependency being had at that time upon the natural pendulosity of the compass to maintain it vertical about the gimbal axes. Thus, in smooth weather or when great accuracy is not desired, it may not be necessary to have the stabilizing means in operation, and it is necessary at this time to remove the load that would otherwise be imposed by the motor 20. I have therefore shown a magnetic clutch 28 between the gear 27 and shaft 16, which is deenergized when the main switch 29 of motor 20 is opened.

In the form of gyro-vertical indicated, the gyroscope is maintained vertical indirectly, that is, through a separate source of power from a gravitational factor, shown as two pairs of pendulums 30 and 31. Said pendulums are shown as pivoted on a downward extension 32 from the gyro casing. Air from the rotor casing continuously flows downwardly into the interior 33 of the extension and out through laterally and oppositely directed pairs of ports 34 and 35 with which the knife edges of the pendulums cooperate. Such a construction is common in the art of gyro-verticals for aircraft and need not be described in detail.

For eliminating the erection during turns, I have shown as pivotally mounted on a vertical axis 36 within the extension 32 a shutter member having four lateral arms 45 each with upturned ends or shutters 37, 37', 38, 38', each of which is adapted to overlie the entrance to one of the ports 34, 35 when the erection is eliminated. At this time the arms uncover downwardly directed ports 46 to permit the escape of the air from the gyro-casing in a neutral direction.

In Figs. 3 and 4, the arms 45 and shutters 37, 38 are shown in this position, that is, in the position to eliminate the erecting force, thus closing the ports 34 and 35 and opening the ports 46. The normal position of said arms and shutters, however, is rotated clockwise through a small angle in Fig. 3 to a position to open ports 34 and 35 and close ports 46, in which position said arms and shutters are normally maintained by the coil spring 39. For rotating said parts to the position shown in Fig. 3, I have shown mounted on the shaft 36 of said arms an armature 40, the poles of which lie adjacent the downwardly extending pole pieces 41 and 42 from the iron core 40' of the coil 43. When the coil 43 is excited, the armature is rotated counter-clockwise to assume the position shown in Fig. 3, in which position the erecting ports 34 and 35 are covered and the bypass ports 46 opened. The winding 43 may be controlled from the contacts 59 on the device 10 so that it is operated simultaneously with the damping eliminating magnet 8.

Figure 5:
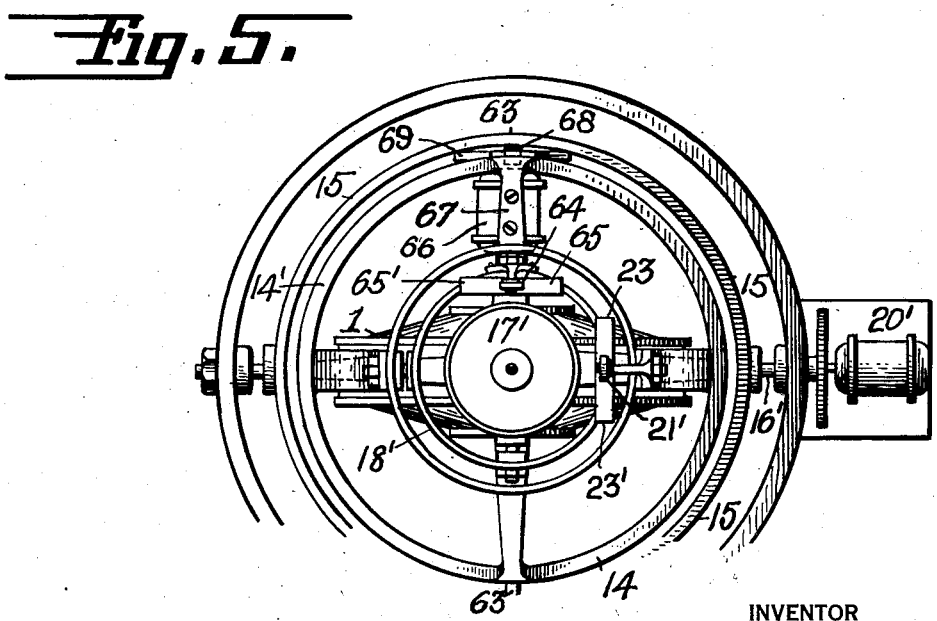
Fig. 5 is a plan view of a modified form of my invention, showing stabilization about both gimbal axes.

Another form of the invention having certain advantages over the simple form described above is shown in Figs. 5 and 6. According to this form, the gimbal mounting is stabilized about both the roll and pitch axes of the ship so that the gyroscope is not allowed to swing in any plane. A simple method of accomplishing this is by mounting the gyro-vertical 17' in this instance directly on the spider 14' of the gyro compass, as by means of arms or brackets 61. The gyro-vertical is shown as gimbaled in said brackets on major axis 19'—19' parallel to axis 16—16' of the compass, and minor axis 62 parallel to the minor axis 63 of the compass. As before, a trolley 21' and reversing contacts 23, 23' are provided between the gimbal ring 18' and the bracket 61 for controlling the power motor 20' for stabilizing the main gimbal 15 of the gyro compass about the roll axis. Likewise, a trolley 64 and reversing contacts 65, 65' are mounted one on the gimbal 18' and the other fixed to the gyro vertical 17' for controlling a motor 66 to stabilize the compass about the pitch axis 63. Said motor is shown as mounted underneath the binnacle ring 14' by means of a bracket 67, and a pinion 68 thereon meshes with a gear sector 69 secured to the gimbal ring 15. It will be evident, therefore, that by this means the compass gimbals are stabilized about both major and minor axes and consequent gimbal error or false yaw entirely eliminated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a gyro-compass, a gimbal ring pendulously pivoted about an axis fixed relative to the ship, a gyroscopic compass element pivotally and pendulously mounted in said ring on an axis perpendicular to said gimbal ring axis, both axes being normally substantially horizontal, a motor for stabilizing said gimbal about the first named axis, a detachable connection between said motor and gimbal, freeing the gimbal when the motor is not operating to permit it to remain normally horizontal, a universally mounted gyro-vertical having one of its horizontal axes parallel to said first named axis, a pick-off between said gyro-vertical and said gimbal for normally controlling said motor, and control connections between said pick-off and said motor.

2. In a gyro-compass, a gimbal ring pendulously pivoted about an axis fixed relative to the ship, a gyroscopic compass element pivotally and pendulously mounted in said ring on an axis perpendicular to said gimbal ring axis, both axes being normally substantially horizontal, a motor for stabilizing said gimbal about the first named axis, a second motor for stabilizing the compass about said second axis, detachable connections between both said motors and the gyroscope or gimbal to free said gyroscope and gimbal when the motors are not operating to permit said gyroscope and gimbal to remain horizontal, a universally mounted gyro-vertical having its two horizontal axes respectively parallel to said other axes, pick-off means on said gyro-vertical about each axis for normally controlling said motors, and control connections, between said pick-off means and said motor.

3. A gyro-compass as claimed in claim 2, wherein said gyro-compass is provided with a turn detector and damping eliminator and said gyro-vertical is provided with gravitationally controlled erecting means, characterized by the provision of means for rendering said erecting means inoperative and said damping eliminator inoperative by said turn detector.

4. In a gyro-compass, a gimbal ring pivoted about an axis fixed relative to the ship, a gyroscopic compass element pivotally mounted in said ring on an axis normal to said gimbal ring axis, both axes being normally substantially horizontal, a motor connected to said gimbal ring for stabilizing it about the first named axis, a universally mounted gyro-vertical having one of its horizontal axes parallel to said first named axis, means governed by the relative inclination of said gyro-vertical and ring for controlling said motor, and means for disconnecting said motor from said gimbal to free the gimbal.

5. In a gimballed gyro-compass having a device responsive to turns and a damping eliminator controlled thereby, an auxiliary gyro-vertical, means controlled by the relative inclination of said gyro-vertical and gyro-compass for stabilizing the gimbal mounting of said gyro-compass about at least the roll axis of the ship, gravitationally controlled means for maintaining said gyro-vertical erect, and means for interrupting the control from said means during turns controlled by said turn responsive device.

6. In a gyro-compass, a gimbal ring pivoted about a normally horizontal axis fixed relative to the ship, a gyroscopic element pivotally mounted on the ring about a second horizontal axis normal to said first axis, motor means connected to said gimbal ring for stabilizing it about said first named axis, a universally mounted gyro-vertical having its two horizontal axes respectively parallel to said other axes, pick-off means between said gyro vertical and said gimbal, control connections between said pick-off and said motor means for controlling said motor means to stabilize said gimbal from said gyro vertical, said gyro vertical having a gravitationally controlled erecting means and means for rendering said erection means inoperative during turns of the ship of sufficient magnitude and rate to otherwise disturb the gyro vertical.

WILLIAM BOLSTER.

REFERENCES CITED

The following references are of record in the file of this patent:

UNITED STATES PATENTS

| Number | Name | Date |
|---|---|---|
| 163,838 | Baker | June 1, 1875 |
| 1,639,233 | Paxton | Aug. 16, 1927 |
| 1,773,412 | Thompson | Aug. 19, 1930 |